(12) United States Patent
Fowler

(10) Patent No.: US 11,421,756 B2
(45) Date of Patent: Aug. 23, 2022

(54) POWER TRANSMISSION CHAIN

(71) Applicant: New Motion Labs Ltd., Exeter (GB)

(72) Inventor: Marcel Fowler, London (GB)

(73) Assignee: NEW MOTION LABS LTD., Exeter (GB)

( * ) Notice: Subject to any disclaimer, the term of this patent is extended or adjusted under 35 U.S.C. 154(b) by 226 days.

(21) Appl. No.: 16/629,918

(22) PCT Filed: Jul. 10, 2018

(86) PCT No.: PCT/GB2018/000105
§ 371 (c)(1),
(2) Date: Jan. 9, 2020

(87) PCT Pub. No.: WO2019/012241
PCT Pub. Date: Jan. 17, 2019

(65) Prior Publication Data
US 2021/0054907 A1    Feb. 25, 2021

(30) Foreign Application Priority Data

Jul. 13, 2017   (GB) .................................. 1711342
Sep. 28, 2017   (GB) .................................. 1715782
Oct. 24, 2017   (GB) .................................. 1717436

(51) Int. Cl.
*F16G 13/06*        (2006.01)
(52) U.S. Cl.
CPC .................... *F16G 13/06* (2013.01)
(58) Field of Classification Search
CPC ...................................................... F16G 13/06
(Continued)

(56) References Cited

U.S. PATENT DOCUMENTS 4,290,762 A * 9/1981 Lapeyre .................. F16G 13/02
198/852
4,378,719 A * 4/1983 Burgess .................. B27B 33/14
474/222
(Continued)

FOREIGN PATENT DOCUMENTS

CN         102537210          7/2012
DE    102014206896 A1    10/2014
(Continued)

OTHER PUBLICATIONS

International Search Report dated Oct. 24, 2018 for PCT/GB2018/000105.
(Continued)

*Primary Examiner* — Gene O Crawford
*Assistant Examiner* — Emily Rose Kincaid
(74) *Attorney, Agent, or Firm* — Saliwanchik, Lloyd & Eisenschenk

(57)    ABSTRACT

A power transmission chain (2) for use with a drive member (4) having a plurality of teeth (6), and wherein: (i) the power transmission chain (2) comprises a plurality of chain links (8) which are pivotally connected together by connecting members (9) and pivot arrangements (10) so that the power transmission chain (2) can pass around the drive member (4) in use; (ii) each one of the pivot arrangements (10) comprises first and second pivots (12, 14) which extend towards each other from opposite sides (16, 18) of the chain links (8); (iii) the first and second pivots (12, 14) have adjacent ends (20, 22) which face each other and which are spaced apart; (iv) the power transmission chain (2) comprises a plurality of engaging formations (24) for enabling engagement with the drive member (4); (v) the engaging formations (24) are positioned between the adjacent ends (20, 22) of the first and second pivots (12, 14); and the engaging formations (24) and the spacing apart of the adjacent ends (20, 22) of the first and
(Continued)

second pivots (12, 14) cause the power transmission chain (2) in use always to be positioned on the drive member (4) for maximum efficiency of drive transfer between the drive member (4) and the power transmission chain (2), and irrespective of the diameter of the drive member (4).

19 Claims, 15 Drawing Sheets

(58) Field of Classification Search
USPC .......................................................... 474/230
See application file for complete search history.

(56) References Cited

U.S. PATENT DOCUMENTS

| | | | |
|---|---|---|---|
| 6,526,740 B1 * | 3/2003 | Tanemoto | ............... F16G 13/02 198/852 |
| 2013/0225345 A1 * | 8/2013 | Bodensteiner | .......... F16G 13/04 474/206 |
| 2014/0057750 A1 * | 2/2014 | Yokoyama | .............. F16G 13/06 474/206 |
| 2014/0141913 A1 * | 5/2014 | Yokoyama | .............. F16G 13/06 474/206 |
| 2016/0348755 A1 * | 12/2016 | Ritz | ........................ F16G 13/04 |

FOREIGN PATENT DOCUMENTS

| | | | | |
|---|---|---|---|---|
| EP | 0171561 A1 | | 2/1986 | |
| GB | 2351543 A | * | 1/2001 | ............. B65G 17/40 |
| GB | 2351543 A | | 1/2001 | |
| JP | 3501493 | | 3/2004 | |

OTHER PUBLICATIONS

Intellectual Property Office, Search Report, GB Application No. 1717436.8, dated Jan. 5, 2018.
Chinese Search Report, Chinese Application No. 201880046123.5.

\* cited by examiner

POWER TRANSMISSION CHAIN

This invention relates to a power transmission chain and, more especially, this invention relates to a power transmission chain which is for use with a drive member having a plurality of teeth.

Power transmission chains which are for use with a drive member having a plurality of teeth are well known.

A first type of known power transmission chain is a roller chain. The roller chain has a plurality of engaging formations for enabling engagement with the drive member. The engaging formations are in the form of receiving formations for receiving the teeth of the drive member. An example of a use of a roller chain is for a bicycle. The roller chain for a bicycle passes around a front drive member in the form of a crank drive member, and it also passes around a rear drive member in the form of a gear wheel. The known roller chains are also able to be used in many other different types of apparatus including, for example, tricycles, motorcycles and chain saws.

A second type of known power transmission chain is a silent chain. The silent chain also has a plurality of engaging formations for enabling engagement with the drive member. The engaging formations are in the form of tooth formations for being received in receiving recesses formed between adjacent teeth on the drive member. The silent chain is used for high torque applications which need high efficiency and the transfer of a lot of power. Typical of such applications is the use of the silent chain as a timing chain for engines. The silent chain is also often referred to as a HY-VO chain.

The known power transmission chains are for enabling the transmission of power between various drive members. The drive members may be drive members which drive the power transmission chain as in the case of a front sprocket drive member on a bicycle, or the drive members may be drive members which are driven by the power transmission chain as in the case of rear gear drive members on a bicycle. The known power transmission chains are formed by chain links which are pivotally connected together by pivots which extend transversely completely across the chain links.

The known power transmission chains are such that they do not transmit drive as efficiently as would be desired. More specifically, the known power transmission chains, invariably pass around two spaced-apart drive members, for example a front drive member in the form of a bicycle crank, and a rear drive member in the form of a bicycle gear. The two drive members will invariably be of different diameters. The different diameters mean that the two drive members will have different numbers of teeth. With the different diameters and the different numbers of teeth, the engaging formations and the teeth are not always in optimum engagement. The result is that the known power transmission chains do not work efficiently for both drive members.

It is an aim of the present invention to reduce the above mentioned problem.

Accordingly, in one non-limiting embodiment of the present invention there is provided a power transmission chain for use with a drive member having a plurality of teeth, and wherein:
  (i) the power transmission chain comprises a plurality of chain links which are pivotally connected together by connecting members and pivot arrangements so that the power transmission chain can pass around the drive member in use;
  (ii) each one of the pivot arrangements comprises first and second pivots which extend towards each other from opposite sides of the chain links;
  (iii) the first and second pivots have adjacent ends which face each other and which are spaced apart;
  (iv) the power transmission chain comprises a plurality of engaging formations for enabling engagement with the drive member;
  (v) the engaging formations are positioned between the adjacent ends of the first and second pivots; and
  (vi) the engaging formations and the spacing apart of the adjacent ends of the first and second pivots cause the power transmission chain in use always to be positioned on the drive member for maximum efficiency of drive transfer between the drive member and the power transmission chain, and irrespective of the diameter of the drive member.

As compared with a known power transmission chain, the power transmission chain of the present invention may provide the following advantages.
  (a) An increased efficiency of drive transfer between the drive member and the power transmission chain. This may be especially so for roller chains. As compared with a known power transmission chain, the power transmission chain of the present invention may also require less lubrication. This may be especially so for silent chains.
  (b) Decreased wear of the power transmission chain and/or the drive member. This decreased wear is due to the power transmission chain being correctly positioned on the teeth of the drive member. This decreased wear may in turn lead to the advantage of being able to use thinner components and/or lighter materials and/or cheaper materials than would otherwise be the case.
  (c) Elimination of chordal action, which is also known as polygonal effect. The chordal action is the power transmission chain and the drive member travelling at different speeds due to their being of different sizes and thus having different numbers of teeth. The elimination of the chordal action is able to be effected in situations where the drive member has a low number of teeth.
  (d) Decreased chain noise in use;
  (e) The use of thinner and/or lighter and/or cheaper materials for producing the power transmission chain and/or the drive member, due to the driving force between the drive member and the power transmission chain being well distributed between all of the teeth on the drive member that are in contact with the power transmission chain during use;
  (f) The teeth of the drive member and components of the power transmission chain may be reduced in size due to the positioning of the power transmission chain in use on the drive member. This reduction in size is then able to lead to savings in manufacturing material.

In a first embodiment of the present invention, the power transmission chain is one in which each one of the engaging formations is a receiving formation, and in which the receiving formation is for receiving one of the teeth on the drive member. Such a power transmission chain may be known as a roller chain, and it may be for use on bicycles, tricycles, motorcycles and chain saws.

The receiving formation may have end walls which define opposite ends of the receiving formation and which cause the first and second pivots to be positioned along the path of the circle.

The power transmission chain may be one in which the end walls extend parallel to each other and transversely of the power transmission chain, and in which the end walls are curved such that the curves extend towards each other and thereby define a waisted shape. The end walls may be curved by being formed by cylinders. The cylinders may alternatively be elliptical shaped members or other shaped members. The end walls, for example the cylinders, may be rotatable with respect to the first and second pivots, or alternatively they may be fixed with respect to the first and second pivots. Rotational arrangements may be employed for open chain systems in order to reduce on friction between the teeth and the end walls. Fixed structure arrangements may be employed for closed systems where lubrication is able to be effected and thus friction between the teeth and the end walls is minimised by the lubricant.

Alternatively, the power transmission chain may be one in which the end walls extend parallel to each other and transversely of the power transmission chain, and in which the end walls are flat and thereby define a straight-sided shape.

In a second embodiment of the invention, the power transmission chain may be one in which each one of the engaging formations is a tooth formation, and in which the tooth formation is for being received in a receiving recess formed between adjacent teeth on the drive member. Such a power transmission chain may be known as a silent chain or a HY-VO chain, and it may be for use as a timing chain.

In all embodiments of the invention, the power transmission chain may be one in which each chain link comprises first and second side plate members, and in which the first and second side plate members are spaced apart.

In all embodiments of the invention, the power transmission chain may be one in which each chain link has end portions which comprise a contact section and a restriction section, in which the restriction section extends towards the contact section, in which in use the contact sections of the chain links contact each other, and in which in use the restriction sections restrict movement of the power transmission chain such that the power transmission chain cannot collapse. The collapsing may be inwardly and/or outwardly, depending upon the construction and intended use of the power transmission chain. The contact sections may be on the inside of the power transmission chain. Alternatively, the contact sections may be on the outside of the power transmission chain. The power transmission chain may be one in which the connecting members stretch and if this happens, then the contact sections may not contact each other as required in order to prevent possible collapse of the power transmission chain. The provision of the contact sections on the outside of the power transmission chain may enable the contact sections, for example contact plates, to be made of a different material than other parts of the power transmission chain. More specifically, the contact sections may be made of flexible materials which are not so strong as the remainder of the parts of the power transmission chain. The resultant construction may facilitate the correct engagement of the contact sections with each other during the life of the power transmission chain. The correct operation of the contact sections may be effective to control the path in which each tooth on the drive member enters its engaging formation, for example its engaging receiving recess. The control may be effective to reduce noise and/or vibration. This in turn may enable the chain and the drive member to be of the same size, and importantly to be manufactured a lot smaller than comparable known prior chain and sprocket arrangements.

The power transmission chain may be one in which the restriction sections are flat, in which the contact sections are flat, in which the restriction sections are at a first angle of inclination, in which the contact sections are at a second angle of inclination, and in which the second angle of inclination is greater than the first angle of inclination.

The power transmission chain may be one in which each of the first and second side plate members has at least one of the restriction sections and at least one of the contact sections.

In all embodiments of the invention, the power transmission chain may be one in which each chain link has one of the engaging formations on an inner surface of the power transmission chain and for engaging the drive member when the drive member is positioned on the inside of the power transmission chain in use. Such a power transmission chain may be used, for example, on a bicycle, tricycle or motorcycle where the gearing is such that the drive member will always be located on the inside of the power transmission chain in use. Such a power transmission chain may be used, for example, for some complex gear systems on bicycles and tricycles.

Alternatively, the power transmission chain may be one in which each chain link has one of the engaging formations on an outer surface of the power transmission chain and for engaging the drive member when the drive member is positioned on the outside of the power transmission chain in use.

Alternatively, the power transmission chain may be one in which each chain link has one of the engaging formations on an inner surface of the power transmission chain and for engaging on the drive member when the drive member is positioned on the inside of the power transmission chain in use, and in which each chain link has one of the engaging formations on an outer surface of the power transmission chain and for engaging the drive member when the drive member is positioned on the outside of the power transmission chain in use. Such a power transmission chain may be used, for example, for some complex gear systems on bicycles and tricycles.

Where the power transmission chain is one in which each chain link has one of the engaging formations only on the inner surface of the power transmission chain or only on the outer surface of the power transmission chain, then for that surface there will typically only be one of the restriction sections and one of the contact sections for each one of the chain links. Where the power transmission chain is one in which each chain link has one of the engaging formations on an inner surface of the power transmission chain and also one of the engaging formations on an outer surface of the power transmission chain, then there will typically be one of the restriction sections and one of the contact sections on the inner surface of the power transmission chain, and also one of the restriction sections and one of the contact sections on the outer surface of the power transmission chain.

In all embodiments of the invention, the connecting members may be connecting plate members.

The present invention also extends to the combination of the power transmission chain of the invention and the drive member.

The present invention also extends to apparatus when provided with the power transmission chain of the invention, or the combination of the power transmission chain of the invention and the drive member. The apparatus may be, for example, in the form of a bicycle, a tricycle, a motorcycle, a chain saw, a windmill or an engine. The apparatus may be other types of apparatus requiring the use of a power transmission chain.

Embodiments of the invention will now be described solely by way of example and with reference to the accompanying drawings in which:

FIG. 19(*b*) is for comparison with FIG. 19(*a*) and shows how a power transmission chain of the present invention is able to be used with a drive member having 16 teeth, 24 teeth and 32 teeth, and how the power transmission chain pivot rotation centres remain constant throughout, thereby providing maximum transmission efficiency;

Referring to FIGS. 1-22, there is shown a power transmission chain 2 for use with a drive member 4 having a plurality of teeth 6. The power transmission chain 2 is that known as a roller chain and it may be used, for example, on bicycles, tricycles, motorcycles, chain saws and windmills.

Figure 7:
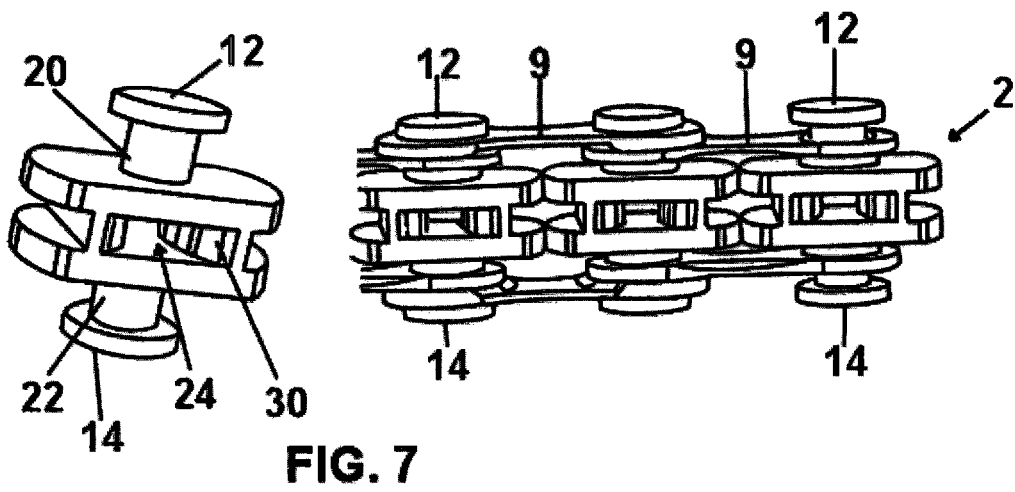
FIG. 7 is a view from underneath and one side of part of the first power transmission chain of the invention shown in FIG. 1, and shows one of the chain links in amplified view.
Figure 8:
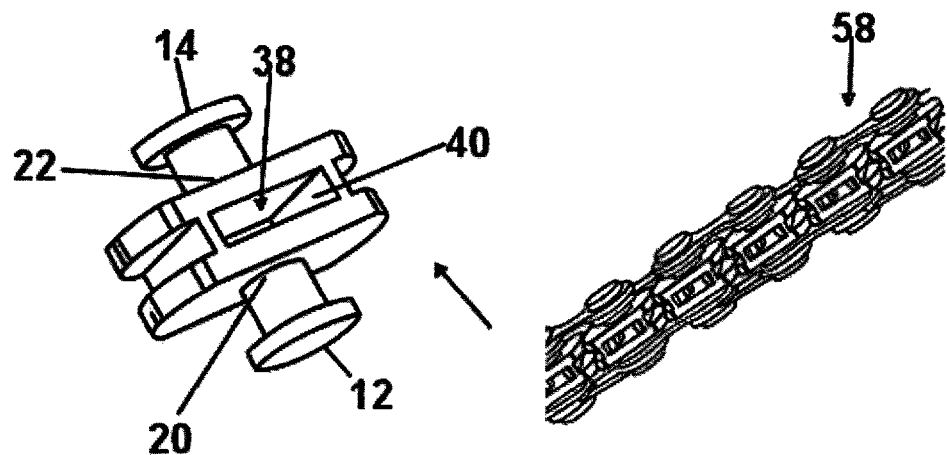
FIG. 8 is a view from above and one side of part of the power transmission chain shown in FIG. 7, and shows one of the chain links in amplified view.

The power transmission chain 2 comprises a plurality of chain links 8 which are pivotally connected together by connecting members 9 and pivot arrangements 10 so that the power transmission chain 2 can pass around the drive member 4 in use. Each one of the pivot arrangements 10 comprises a first pivot 12 and a second pivot 14. The first and second pivots 12, 14 extend towards each other from opposite sides 16, 18 respectively of the chain links 8. As best shown in FIGS. 7 and 8, the first and second pivots 12, 14 have adjacent ends 20, 22 respectively which face each other and which are spaced apart and thereby define a gap.

The power transmission chain 2 comprises a plurality of engaging formations 24 for enabling engagement with the drive member 4. The engaging formations 24 are positioned between the adjacent ends 20, 22 of the first and second pivots 12, 14. The engaging formations 24 and the spacing apart of the adjacent ends 20, 22 of the first and second pivots 12, 14 cause the power transmission chain 2 always to be positioned on the drive member 4 for maximum efficiency of drive transfer between the drive member 4 and the power transmission chain 2, and irrespective of the diameter of the drive member 4. The engaging formations 24 are shaped to cause the first and second pivots 12, 14 to be positioned along the path of a circle 26 which is able to be circumscribed through the tips 28 of the teeth 6 of the drive member 4.

The power transmission chain 2 is one in which each one of the engaging formations 24 is a receiving formation 30, and in which the receiving formation 30 is for receiving one of the teeth 6 on the drive member 4.

The receiving formation 30 has end walls 32, 34 which define opposite ends of the receiving formation 30. The end walls 32, 34 cause the first and second pivots 12, 14 to be positioned along the path of the circle 26. As can be seen from the drawings, the end walls 32, 34 extend parallel to each other and transversely of the power transmission chain 2.

In one embodiment of the invention and as shown in FIGS. 1-8, the end walls 32, 34 are curved such that the curves extend towards each other and thereby define a waisted shape.

Figure 9:
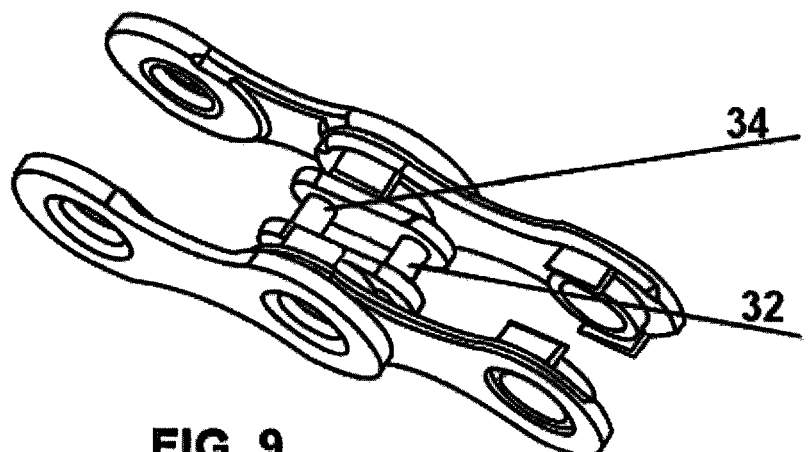
FIG. 9 is a view from above and one side of an alternative chain link to that shown in FIGS. 7 and 8.
Figure 10:
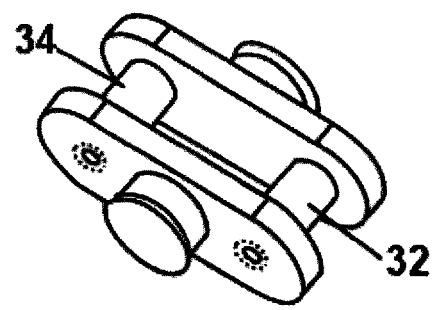
FIG. 10 is an enlarged view of part of the chain link shown in FIG. 9.

In another embodiment of the invention as shown in FIGS. 9 and 10, the end walls 32, 34 are formed by cylinders. The cylinders may be rotatable with respect to the first and second pivots 12, 14, for example for open chain systems where the rotation will reduce friction between the end walls 32, 34 and the teeth 6 of the drive member 4. The cylinders may alternatively be fixed with respect to the first and second pivots 12, 14, for example in closed chain systems. The closed chain systems are able to have lubrication which minimises friction between the end walls 32, 34 and the teeth 6 of the drive member 4.

Figure 11:
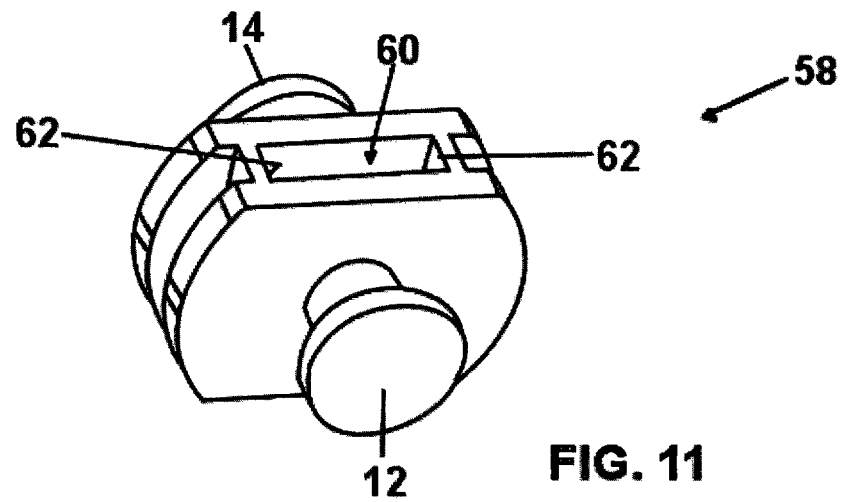
FIG. 11 is an amplified view from above and one side of a further alternative chain link to that shown in FIGS. 7 and 8, and able to be used in a second power transmission chain of the present invention.
Figure 12:
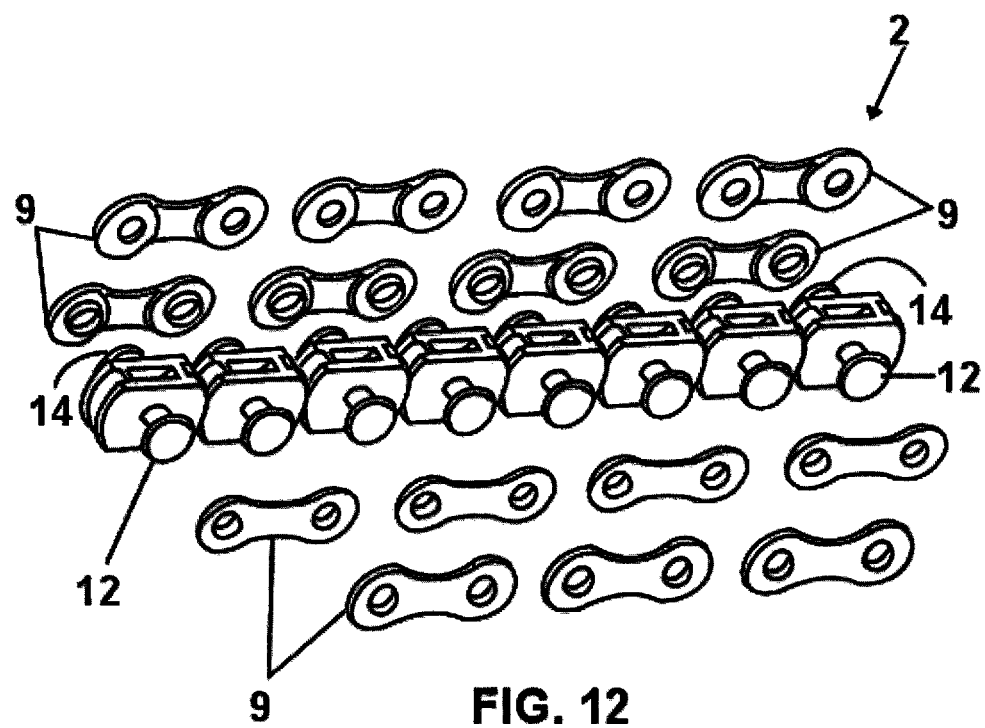
FIG. 12 is an exploded view of part of the first power transmission chain shown in FIG. 1.

In a further embodiment of the invention as shown in FIGS. 11 and 12, the end walls 32, 34 extend parallel to each other and transversely of the power transmission chain 2, but they are also flat and thus they thereby define a straight-sided shape.

The power transmission chain 2 may be made of various materials including metals and plastics materials. In use of the power transmission chain 2, the connecting members 9 may stretch by a very small amount but which is still such as to alter the initial placing of each tooth 6 in its receiving formation 30. If the stretching occurs, then a first tooth 6 may fit precisely as required in a first receiving formation 30, but then a second tooth will fit progressively less perfectly in its second receiving formation 30, and the misalignment progressively occurs over the third tooth 6 and the subsequent teeth 6. In order to counter the effects of the receiving formation 30 changing shape such as to reduce optimum performance and efficiency of the power transmission chain 2, it is preferred that the end walls 32, 34 are curved, with the curves preferably being formed as part of cylinders as shown in FIG. 9 but alternatively being curved such as shown in FIGS. 1-8. Other curved shaped may be employed so that, the end walls 32, 34 may be formed by elliptically shaped members.

Figure 23:
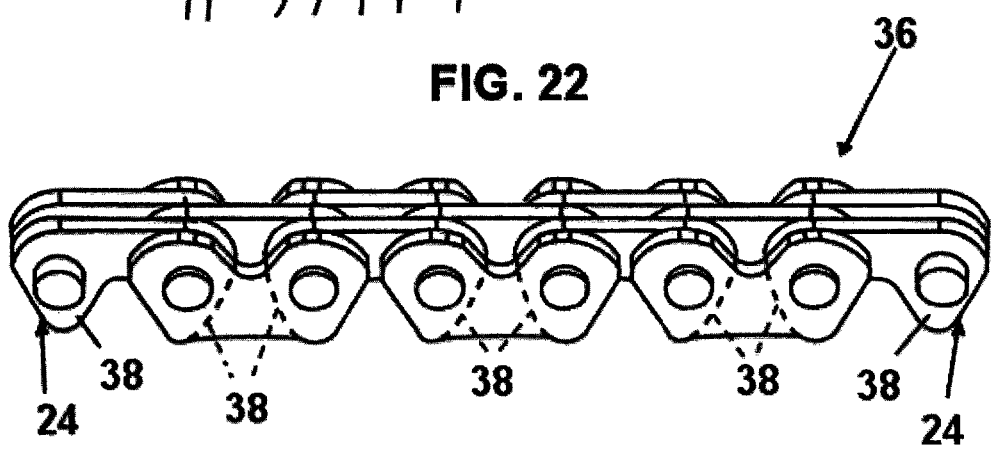
FIG. 23 shows part of a third power transmission chain of the present invention, the power transmission chain being in the form of a silent chain and in use on a drive member.

FIG. 23 shows a third power transmission chain 36 which is known as a silent chain or a HY-VO chain. The power transmission chain 36 has engaging formations 24. However, each engaging formation 24 in the power transmission chain 36 is in the form of a tooth formation 38. The tooth formation 38 is for being received in a receiving recess 40 formed between adjacent teeth 6 on the drive member 4. As will be appreciated from FIG. 20, each tooth 6 on the drive member 4 has one side 39 forming part of one receiving recess 40, and an opposite side 41 forming part of another receiving recess 40.

The power transmission chain 2 and the power transmission chain 36 are also both such that each chain link 8 has end portions 42 which comprise a contact section 44 and a restriction section 46. The restriction section 46 extends inwardly towards the contact section 44. The contact sections 44 of the chain links 8 contact each other. The restriction sections 46 restrict movement of the power transmission chain 2, 36 such that the power transmission chain 2, 36 cannot collapse.

The restriction sections 46 are flat. The contact sections 44 are flat. The restriction sections 46 are at a first angle of inclination. The contact sections 44 are at a second angle of inclination. The second angle of inclination is greater than the first angle of inclination.

The power transmission chains 2, 36 are such that each one of the chain links 8 comprises a first side plate 48 and a second side plate 50. The first and second side plates 48, 50 are spaced apart. Each of the first and second side plates 48, 50 has at least one of the restriction sections 46 and at least one of the contact sections 44.

Figure 3:
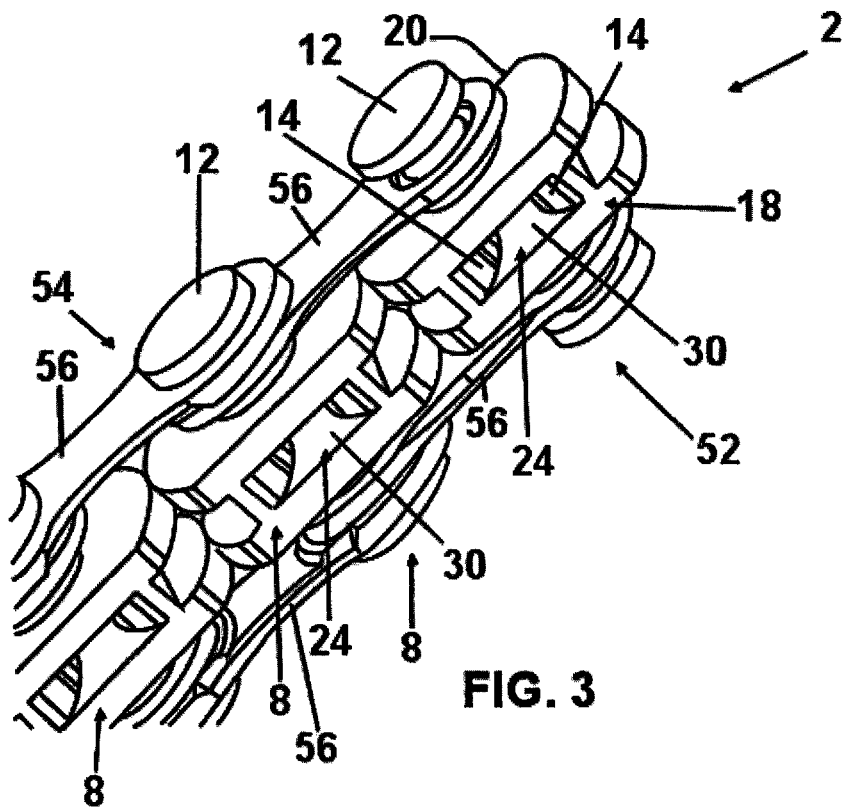
FIG. 3 is a view from underneath and one side of part of the first power transmission chain shown in FIG. 1.
Figure 4:
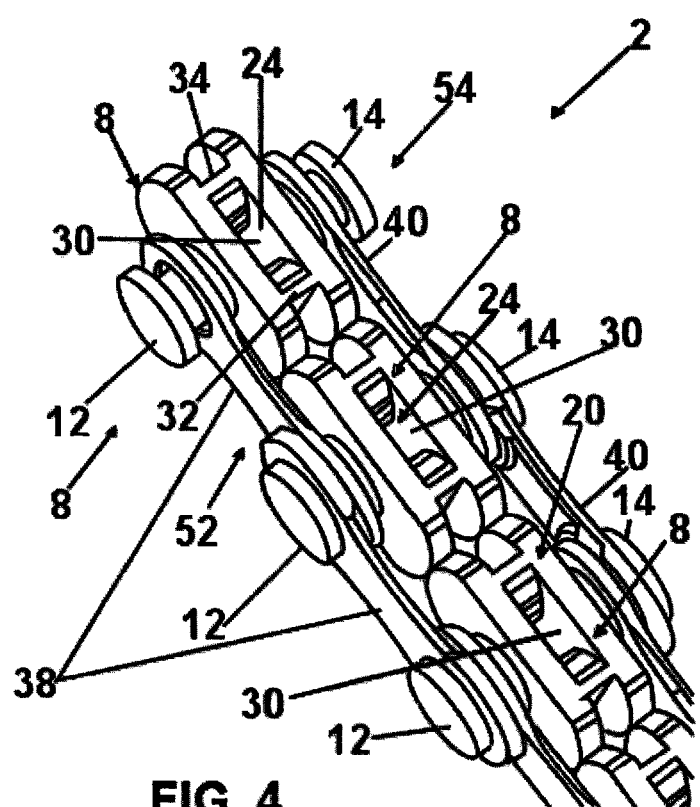
FIG. 4 is a view from above and one side of part of the power transmission chain shown in FIG. 3.
Figure 5:
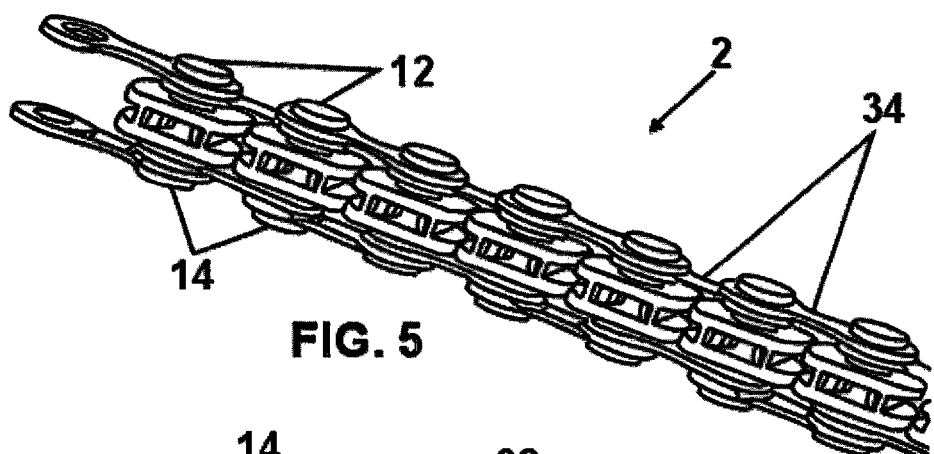
FIG. 5 is a view from underneath and one side showing more of the power transmission chain shown in FIG. 3.
Figure 6:
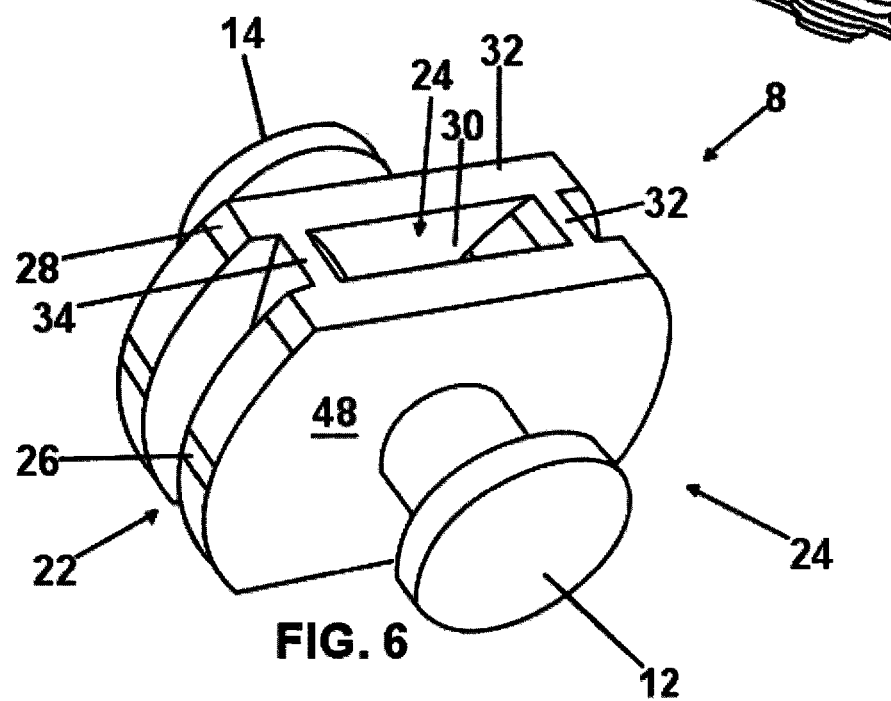
FIG. 6 is a view from above and one side of a chain link forming part of the first power transmission chain shown in FIG. 1.
Figure 15:
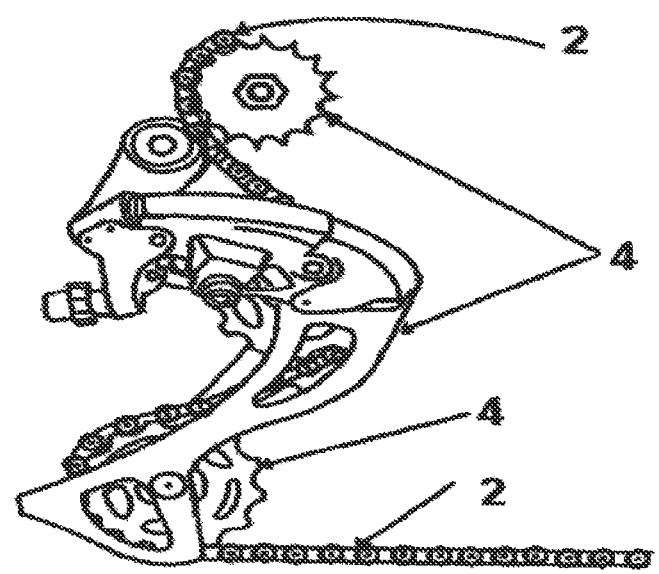
FIG. 15 is a side view in simplified form of a derailleur gear system using a power transmission chain of the present invention.

As can be seen from a comparison of FIGS. 3 and 4, each chain link 8 has one of the engaging formations 24 on an inner surface 52 of the power transmission chain 2. This inner surface 52 is for engaging the teeth 6 on the drive member 4 when the drive member 4 is positioned on the inside of the power transmission chain 2 in use. Each chain link 8 also has one of the engaging formations 24 on an outer surface 54 of the power transmission chain 2. The outer surface 54 is for engaging the teeth 6 on the drive member 4 when the drive member 4 is positioned on the outside of the power transmission chain 2 in use. This particular use of the power transmission chain 2 is shown in FIG. 15 where it will be appreciated that the power transmission chain 2 is passing around different drive members 4. In alternative embodiments of the invention where just one drive member 4 is being employed, the power transmission chain 2 could be one in which each chain link 8 has one of the engaging formations 24 only on the inner surface 52 of the power transmission chain 2 and for engaging the teeth 6 on the drive member 4 when the drive member 4 is positioned on the inside of the power transmission chain 2 in use. Alternatively, the power transmission chain 2 may be one in which each chain link 8 has one of the engaging formations 24 only on the outer surface 54 of the power transmission chain 2 and for engaging the teeth 6 on the drive member 4 when the drive member 4 is positioned on the outside of the power transmission chain in use.

In alternative embodiments of the invention (not shown), the power transmission chain 2 referred to above may be replaced by the power transmission chain 36.

As shown in FIGS. 3, 4, and 12, the chain links 8 comprise connecting members 56 which are mounted on the first and second pivots 12, 14. The connecting members 56 connect the chain links 8 together such that the chain links 8 are able to pivot about the pivot arrangements 10 and thus pass around the drive member 4.

Referring now to FIGS. 11 and 12, there is shown part of a power transmission chain 58 which is like the power transmission chain 2. Similar parts as in the power transmission chain 2 have been given the same reference numerals for ease of comparison and understanding.

The power transmission chain 58 has a receiving formation 60 which is different to the shape of the receiving formation 30 in the power transmission chain 2. The receiving formation 60 has straight side walls 62 as shown.

Figure 13:
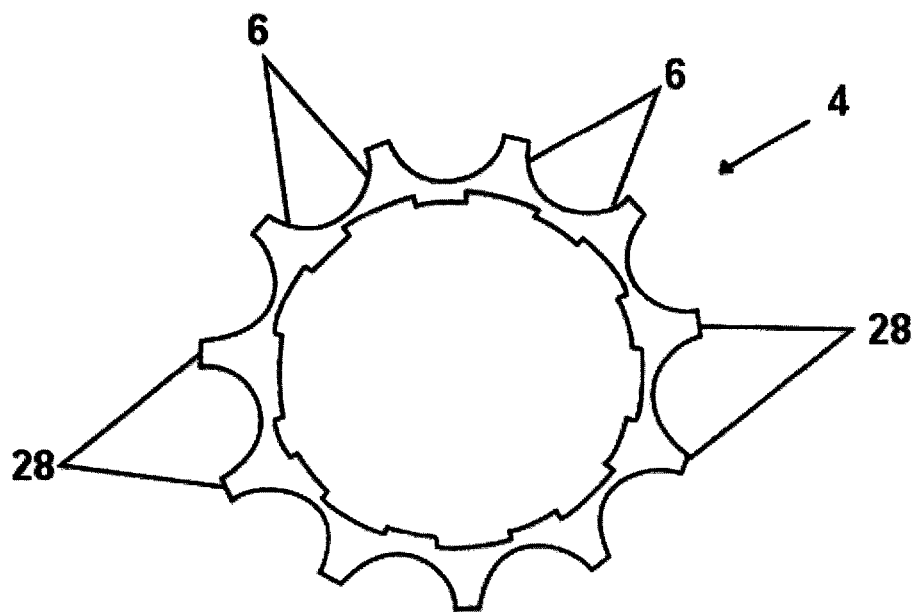
FIG. 13 is a side view of a first drive member for use with a power transmission chain of the present invention.
Figure 14:
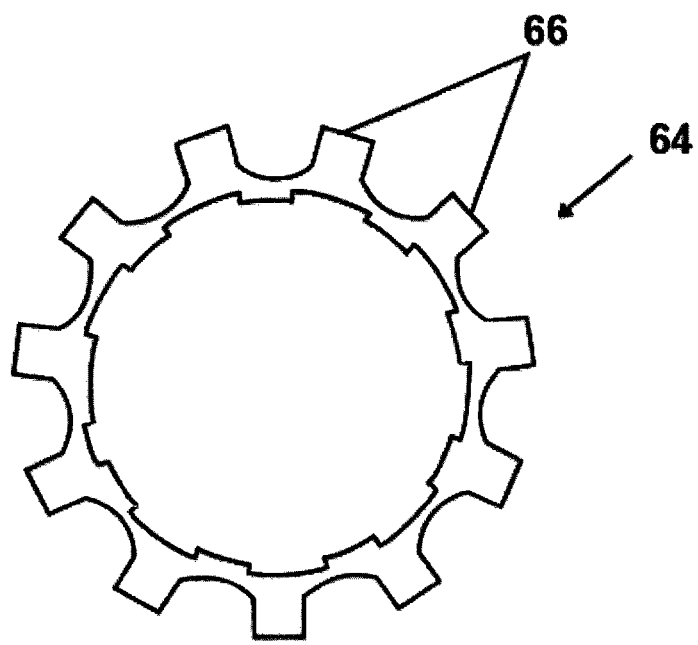
FIG. 14 is a side view of a second drive member for use with a power transmission chain of the present invention.

FIG. 13 shows the drive member 4. FIG. 14 shows a drive member 64 which is an alternative to the drive member 4. It will be seen that the drive member 4 has teeth 6 with substantially pointed tips. In contrast the drive member 64 has teeth 66 with square tips 68.

Figure 16:
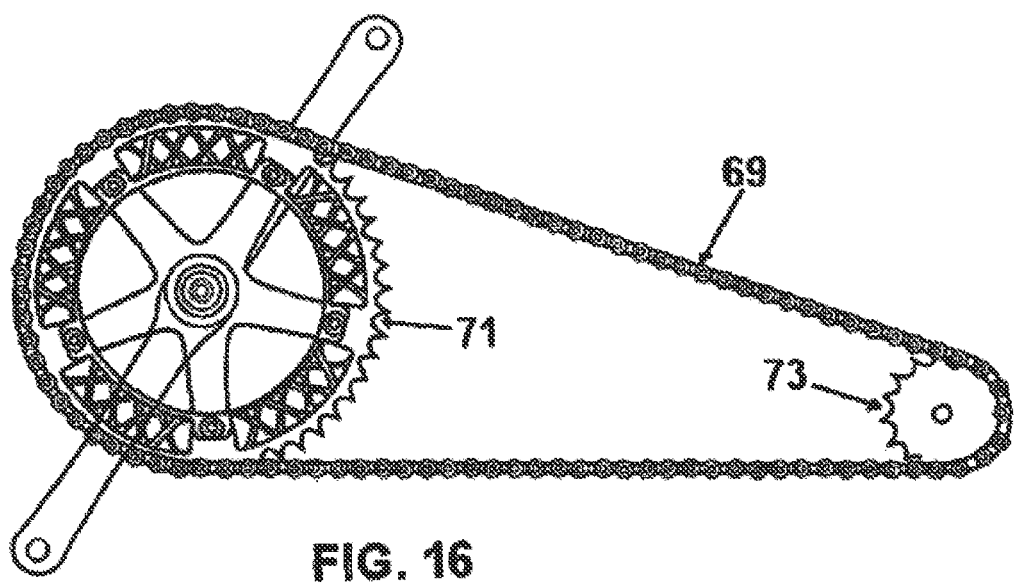
FIG. 16 shows a known roller chain on a front crank drive member and a rear gear drive member of a bicycle.

FIG. 16 shows a known roller chain 69 on a front crank drive member 71 and a rear gear drive member 73 of a bicycle.

Figure 17:
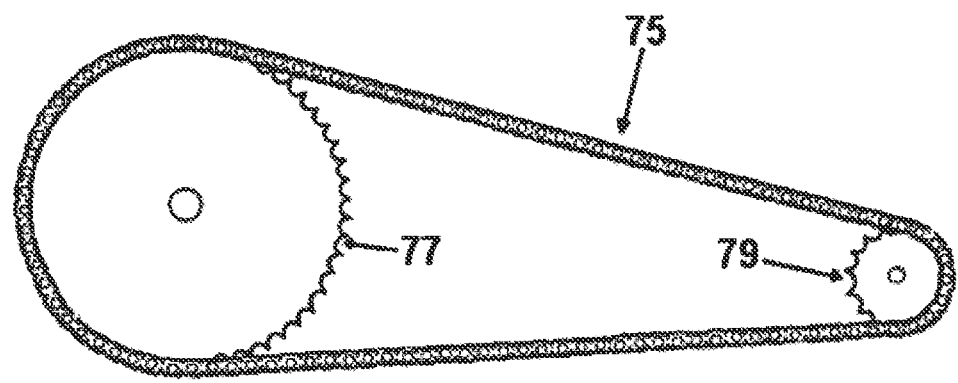
FIG. 17 shows a roller chain of the present invention on a front crank drive member and a rear gear drive member of a bicycle.

FIG. 17 shows a roller chain 75 of the present invention on a front crank drive member 77 and a rear gear drive member 79 of a bicycle.

Figure 18:
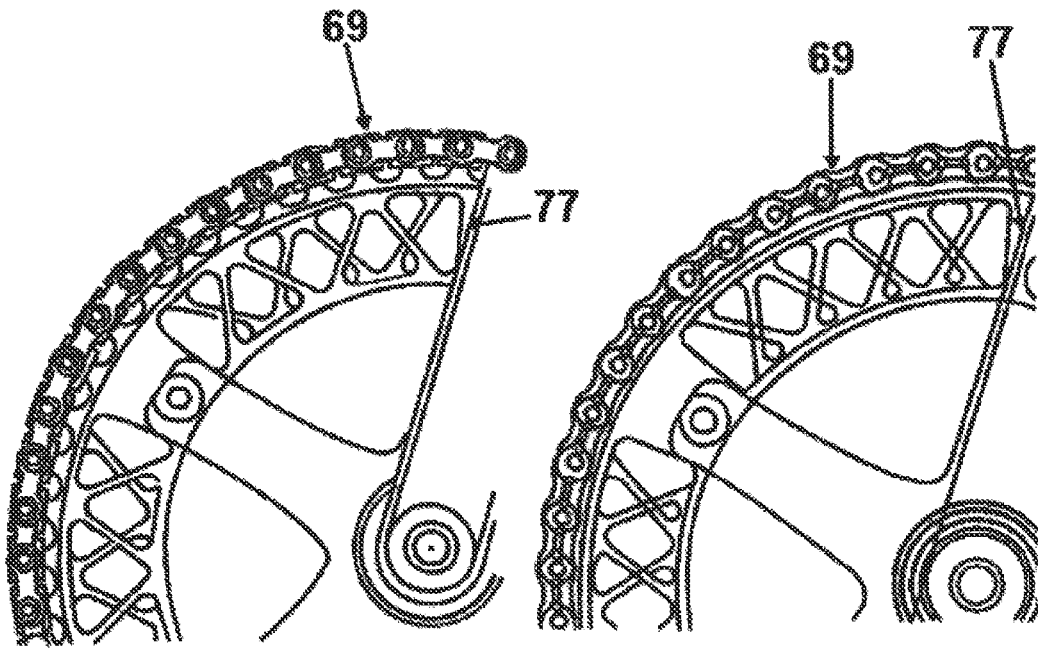
FIG. 18 illustrates the operation of a known power transmission chain around a drive member, and illustrates how the tips of the teeth are positioned at different places in the power transmission chain, leading to loss of transmission efficiency.
Figure 19:
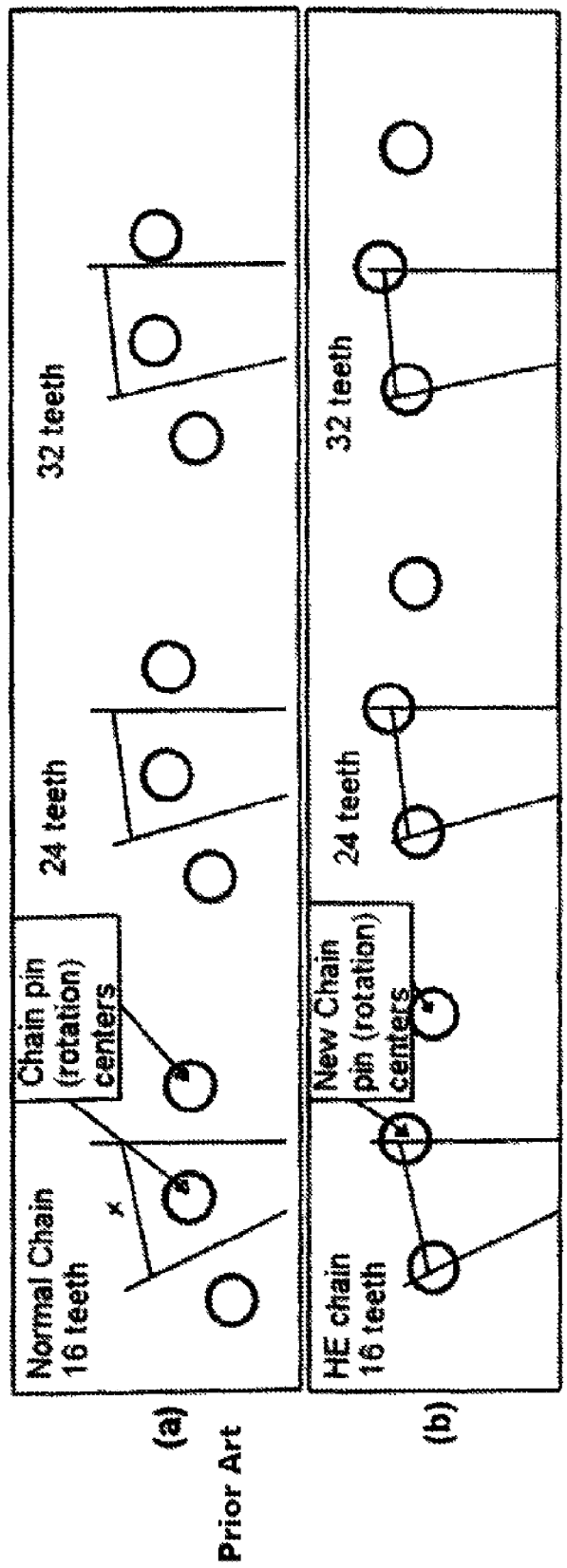
FIG. 19(*a*) shows how known power transmission chains having 16 teeth, 24 teeth and 32 teeth lose transmission efficiency due to the chain pivot rotation centres being in varying positions.

FIG. 18 illustrates how the power transmission chain 69 in use as in FIG. 16 does not operate as efficiently as would be desired. More specifically, FIG. 18 illustrates that because polygons are of the same and the points on the polygon are not of the same location, the known power transmission chain 69 cannot fit exactly as required on both the front crank drive member 77 and the rear gear drive member 79 because they are of different sizes.

FIG. 19(a) shows how in a known power transmission chain having 16 teeth, 24 teeth and 32 teeth, the only distance that is kept constant for all numbers of teeth and all diameters of the drive member is the tooth tip separation distance "x". This means that in a known drive chain, the pivot centres move with smaller and larger numbers of teeth, so that the known power transmission chain does not precisely attach in place of maximum transmission efficiency for different drive members having different diameters.

FIG. 19(b) shows how a power transmission chain of the present invention having 16 teeth 24 teeth and 32 teeth provides maximum drive transfer efficiency. This is because the centres of the first and second pivots 12, 14 stay in the same location, no matter how many teeth the drive member 4 has.

Figure 1:
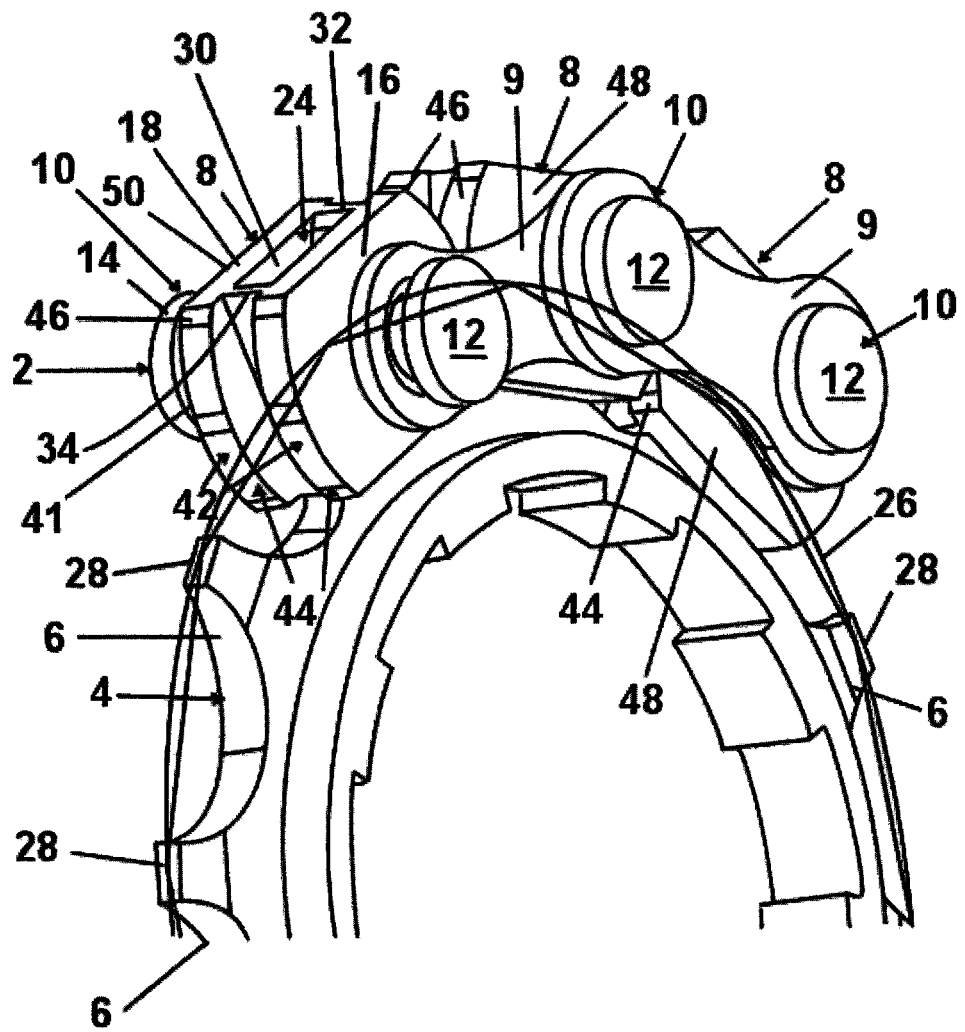
FIG. 1 shows part of a first power transmission chain of the present invention, the power transmission chain being in the form of a roller chain and in use on a drive member.
Figure 20:
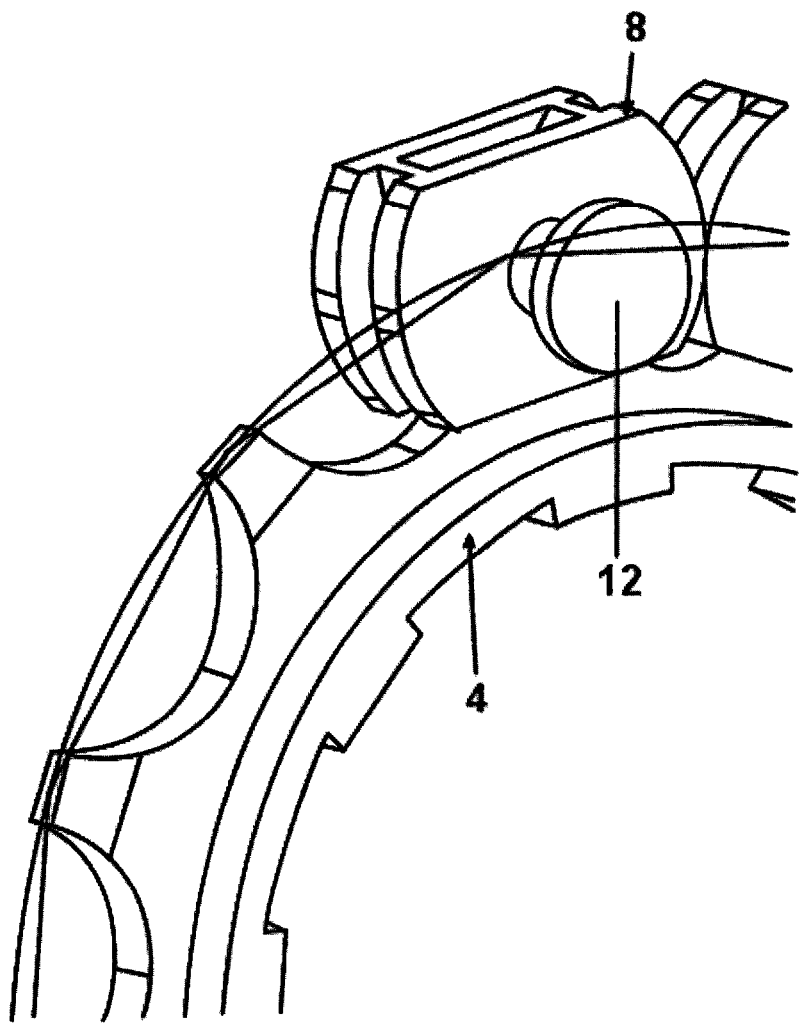
FIG. 20 is a view showing part of FIG. 1 and illustrates how the pivots of the power transmission chain are positioned at the circumference of the drive member.

FIG. 20 is an enlarged view of part of FIG. 1 and shows one of the chain links 8 with its pivot 10 being positioned at the circumference of the drive member 4.

Figure 21:
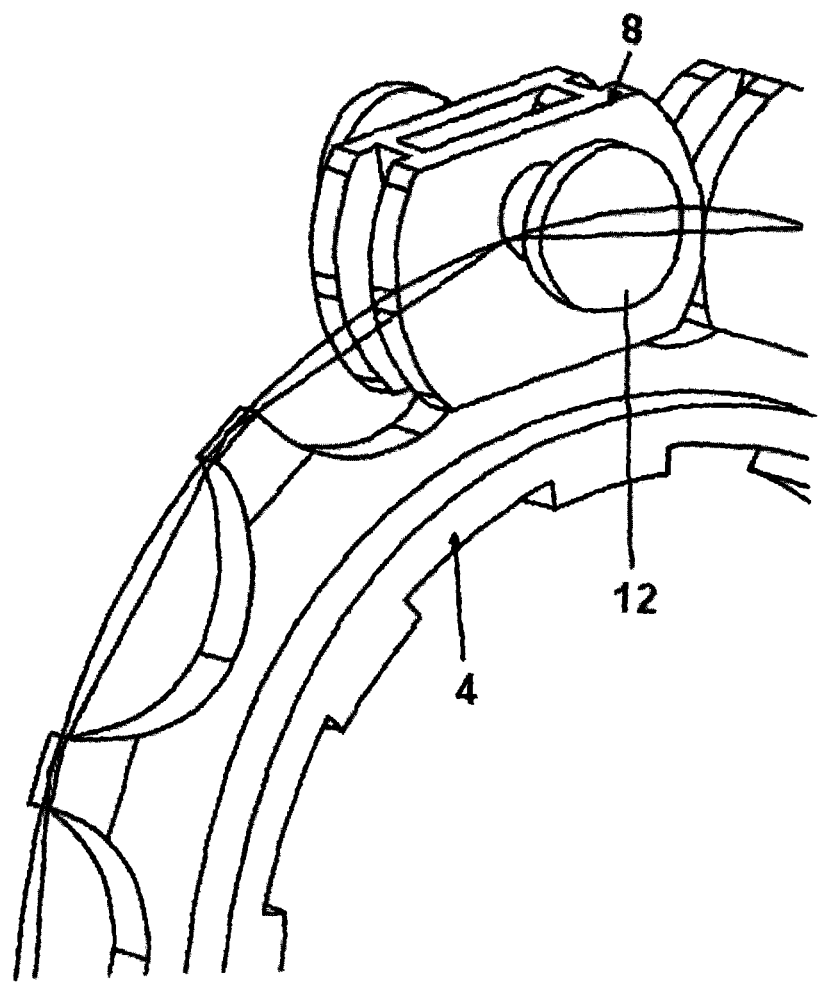
FIG. 21 is a view like FIG. 20 but shows how the pivots of the power transmission chain may be modified to occur outside the circumference of the drive member.

FIG. 21 is a view like FIG. 20 but shows a modification to the power transmission chain 2. More specifically, FIG. 21 shows a power transmission chain 70 in which similar parts as in the power transmission chain 2 have been given the same reference numbers for ease of comparison and understanding. In FIG. 21, it will be seen that the chain links 8 have been modified such that the pivot arrangements 10 have first and second pivots 12, 14 occurring outside the circumference of the drive member 4.

Figure 22:
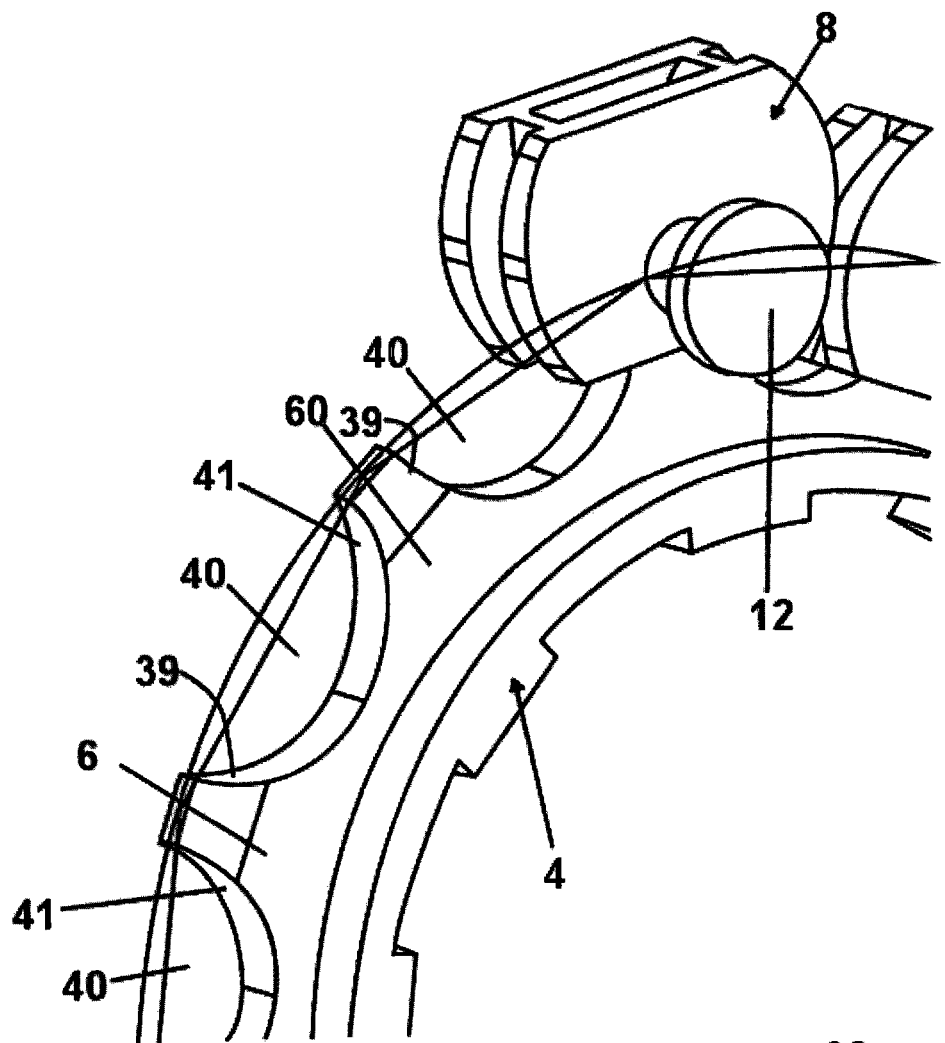
FIG. 22 is a view like FIG. 20 but shows how the pivots of the power transmission chain may be modified to occur inside the circumference of the drive member.

FIG. 22 is also like FIG. 20 but shows another modification to the power transmission chain 2. In FIG. 22, there is shown a power transmission chain 72 which is like the power transmission chain 2 except that the chain links 8 have been modified such that the pivot arrangements 10 with their first and second pivots 12, 14 occur inwardly of the periphery of the drive member 4. In FIG. 22 similar parts as in the power transmission chain 2 have again been given the same reference numerals for ease of comparison and understanding.

Figure 2:
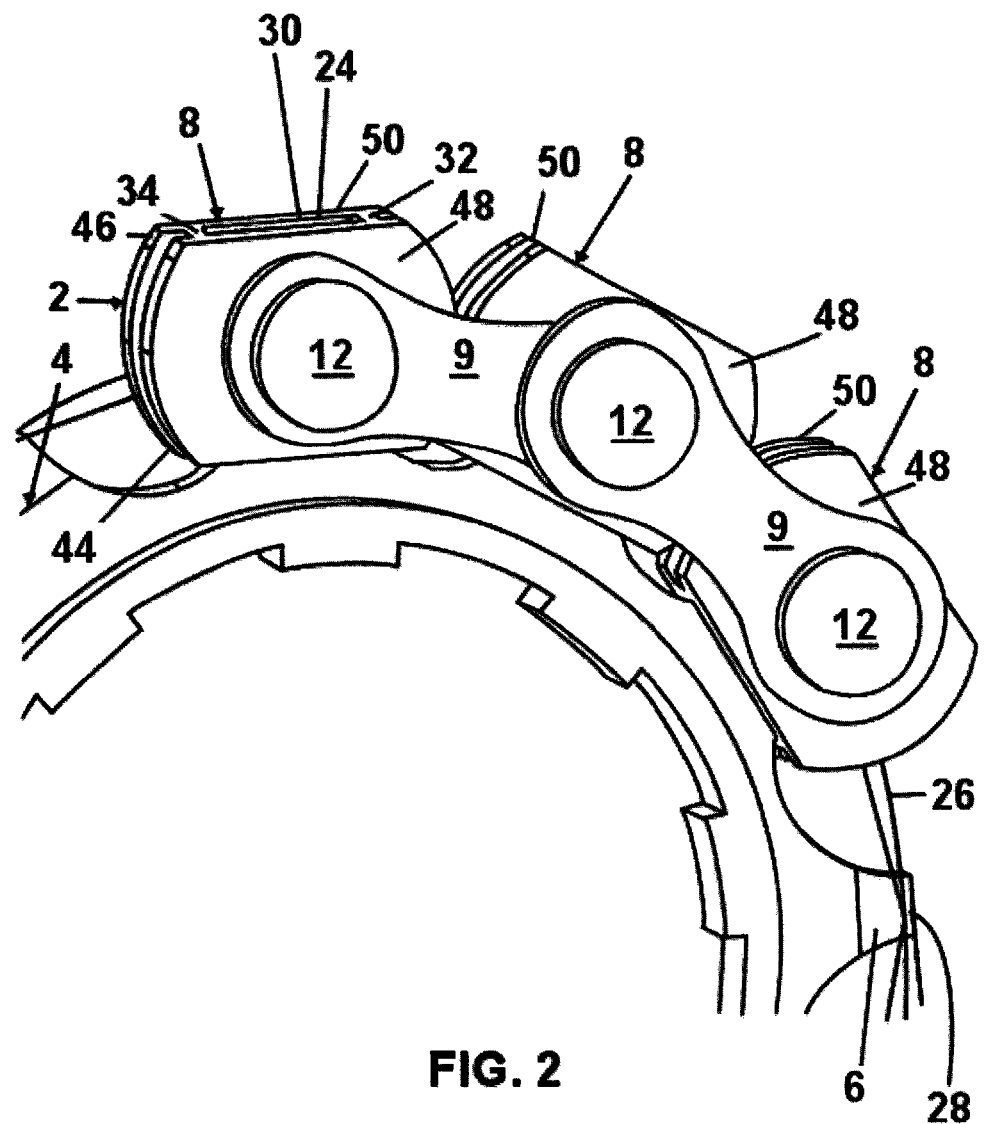
FIG. 2 is an enlarged view of part of FIG. 1 and from a different angle.
Figure 24:
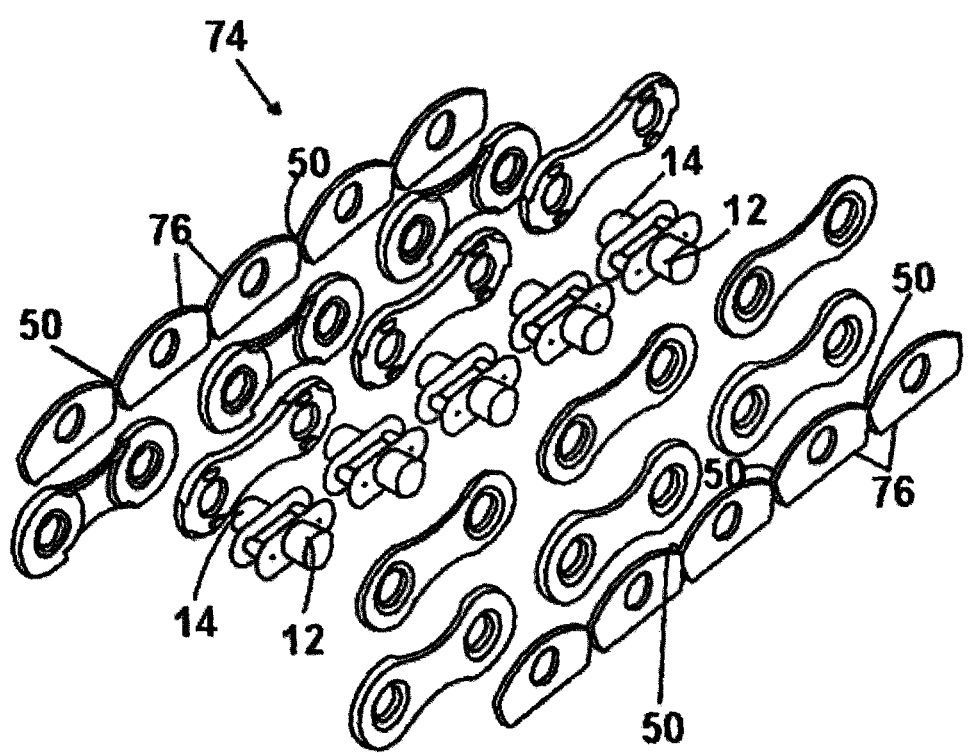
FIG. 24 is an exploded view of part of a fourth power transmission chain of the present invention, with the power transmission chain having contact section on the outside of the power transmission chain rather than on the inside of the power transmission chain as shown in FIG. 2.

Referring to FIG. 24, there is shown part of a power transmission chain 74. Similar parts as in previous Figures have been given the same reference numerals for comparison and understanding. In FIG. 24, it will be seen that the contact sections 44 are on the outside of the power transmission chain 74 as opposed to being on the inside of the power transmission chain 2 as shown in FIG. 2. Provision of the contact sections on the outside of the power transmission chain 74 as shown in FIG. 24 may enable the chain part 76 to be made of more flexible and less strong materials than the remainder of the chain parts. This in turn may enable chain parts to stretch, and yet have the contact sections 44 properly contacting. The contact sections are thus able to control the path in which the transmission chain recess enters the drive member sprocket. This in turn helps to control power transmission chain operation and in particular reduced noise and vibration. This in turn may enable the power transmission chain and the drive member to be of the same size and a lot smaller than is possible with known prior art systems.

Figure 25:
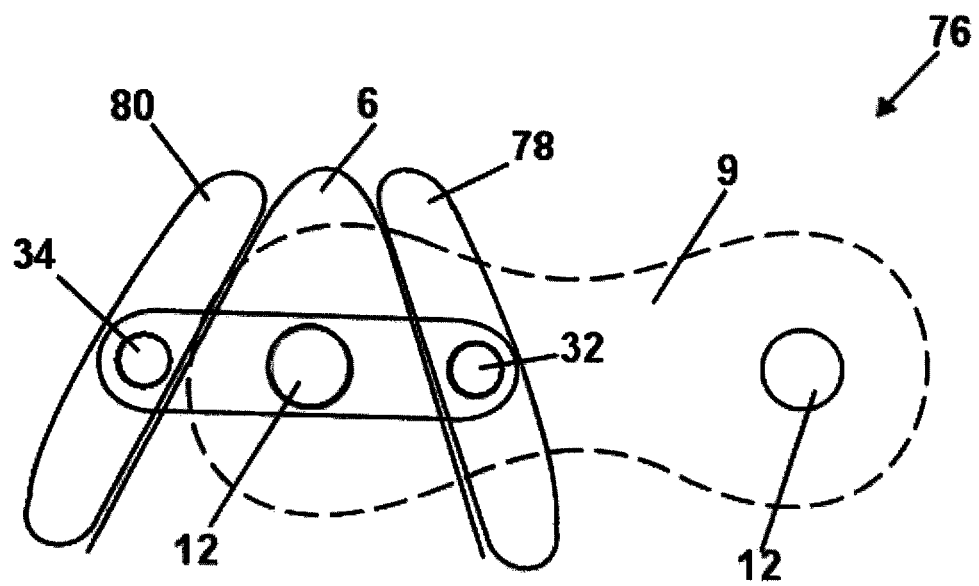
FIG. 25 shows part of a fifth power transmission chain of the present invention, with the power transmission chain having additional members shown in a first position.
Figure 26:
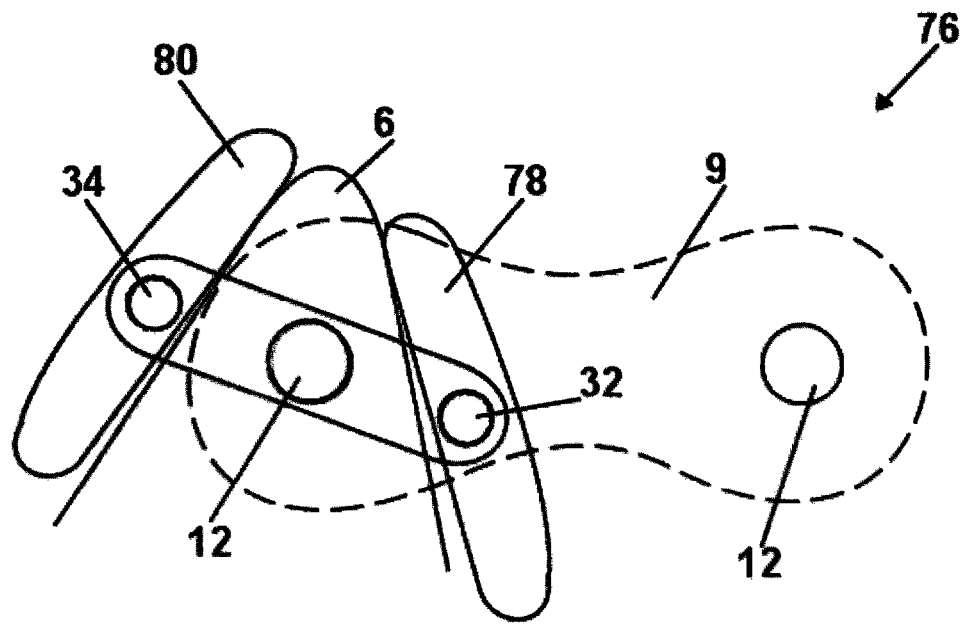
FIG. 26 shows the part of the fifth power transmission chain shown in FIG. 25 but with the additional members in a second position.

Referring to FIGS. 25 and 26, there is shown part of a fifth transmission chain 76. Similar parts as in previous Figures have been the same reference numerals for ease of comparison and understanding. The transmission chain 76 has extra members 78, 80 as shown. The members 78, 80 provide an increased contact area with the gear tooth 6 as shown. The increased contact area provided by the members 78, 80 enables the spread of pressure, with a resulting decrease in the load on the transmission chain 76. This in turn may decrease wear in the transmission chain 76. The increased contact area afforded by the members 78, 80 increases friction and thus the transmission chain 76 is best suited for use in closed systems where good lubrication of the transmission chain 76 is easily able to be made. The members 78, 80 may be of other shapes providing they provide the increased contact area.

It is to be appreciated that the embodiments of the invention described above with reference to the accompanying drawings have been given by way of example only and that modifications may be effected. Thus, for example, the power transmission chains 2, 36, 70, 72, 74 and 76 may be for use with drive members having different numbers of teeth to those mentioned above. Individual components shown in the drawings are not limited to use in their drawings and they may be used in other drawings and in all aspects of the invention. The invention also extends to the individual components mentioned and/or shown above, taken singly or in any combination.

The invention claimed is:

1. A power transmission chain for use with a drive member having a plurality of teeth, and wherein:
   (i) the power transmission chain comprises a plurality of chain links which are pivotally connected together by connecting members and pivot arrangements so that the power transmission chain can pass around the drive member in use;
   (ii) each one of the pivot arrangements comprises first and second pivots which extend towards each other from opposite sides of the chain links;
   (ii) the first and second pivots have adjacent ends which face each other and which are spaced apart;
   (iv) the power transmission chain comprises a plurality of engaging formations for enabling engagement with the drive member;
   (v) the engaging formations are positioned between the adjacent ends of the first and second pivots; and
   (vi) the engaging formations and the spacing apart of the adjacent ends of the first and second pivots cause the power transmission chain in use always to be positioned on the drive member for maximum efficiency of drive transfer between the drive member and the power transmission chain, and irrespective of the diameter of the drive member.

2. The power transmission chain according to claim 1 wherein each one of the engaging formations is a receiving formation, and in which the receiving formation is for receiving one of the teeth on the drive member.

3. The power transmission chain according to claim 2 wherein the receiving formation has end walls which define opposite ends of the receiving formation and which cause the first and second pivots to be positioned along the path of a circle.

4. The power transmission chain according to claim 3 wherein the end walls extend parallel to each other and transversely of the power transmission chain, and wherein the end walls are curved such that the curves extend towards each other and thereby define a waisted shape.

5. The power transmission chain according to claim 4 wherein the end walls are formed by cylinders.

6. The power transmission chain according to claim 5 wherein the cylinders are rotatable with respect to the first and second pivots.

7. The power transmission chain according to claim 5 wherein the cylinders are fixed with respect to the first and second pivots.

8. The power transmission chain according to claim 3 wherein the end walls extend parallel to each other and transversely of the power transmission chain, and in which the end walls are flat and thereby define a straight sided shape.

9. The power transmission chain according to claim 1 wherein each one of the engaging formations is a tooth formation, and wherein the tooth formation is for being received in a receiving recess formed between adjacent teeth on the drive member.

10. The power transmission chain according to claim 1 wherein each chain link comprises first and second side plate members, and wherein the first and second side plate members are spaced apart.

11. The power transmission chain according to claim 1 wherein each chain link has end portions which comprise a contact section and a restriction section, wherein the restriction section extends towards the contact section, wherein in use the contact sections of the chain links contact each other, and wherein in use the restriction sections restrict movement of the power transmission chain such that the power transmission chain cannot collapse.

12. The power transmission chain according to claim 11 wherein the restriction sections are flat, wherein the contact sections are flat, in which the restriction sections are at a first angle of inclination, wherein the contact sections are at a second angle of inclination, and wherein the second angle of inclination is greater than the first angle of inclination.

13. The power transmission chain according to claim 12 wherein each of the first and second side plate members has at least one of the restriction sections and at least at least one of the contact sections.

14. The power transmission chain according to claim 1 wherein each chain link has one of the engaging formations on an inner surface of the power transmission chain and for engaging the drive member when the drive member is positioned on the inside of the power transmission chain in use.

15. The power transmission chain according to claim 1 wherein each chain link has one of the engaging formations on an outer surface of the power transmission chain and for engaging the drive member when the drive member is positioned on the outside of the power transmission chain in use.

16. The power transmission chain according to claim 1 wherein each chain link has one of the engaging formations on an inner surface of the power transmission chain and for engaging the drive member when the drive member is positioned on the inside of the power transmission chain in use, and wherein each chain link has one of the engaging formations on an outer surface of the power transmission chain and for engaging the drive member when the drive member is positioned on the outside of the power transmission chain in use.

17. The power transmission chain according to claim 1 wherein the connecting members are connecting plate members.

18. The power transmission chain according to claim 1 and further comprising the combination of said power transmission chain with said drive member.

19. An apparatus when provided with the power transmission chain according to claim 1, wherein the apparatus is a bicycle, a tricycle, a motorcycle, a chain saw, a windmill, or an engine.

* * * * *